US012761914B1

(12) United States Patent
Agadakos et al.

(10) Patent No.: US 12,761,914 B1
(45) Date of Patent: Oct. 13, 2026

(54) GENERATION OF ANNOTATED CALL GRAPHS

(71) Applicant: Amazon Technologies, Inc., Seattle, WA (US)

(72) Inventors: Ioannis Agadakos, Chicago, IL (US); Nicolas Leandro Rosner, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 18/534,488

(22) Filed: Dec. 8, 2023

(51) Int. Cl.
*G06F 8/73* (2018.01)
*G06F 8/75* (2018.01)

(52) U.S. Cl.
CPC . *G06F 8/73* (2013.01); *G06F 8/75* (2013.01)

(58) Field of Classification Search
CPC .................................... G06F 8/73; G06F 8/75
USPC ................. 717/104–123, 132–133, 142–144
See application file for complete search history.

(56) References Cited

U.S. PATENT DOCUMENTS 11,169,786 B2 * 11/2021 Badlani ................ G06N 3/0442
2023/0130781 A1 * 4/2023 Suneja ................... G06N 20/00 706/12

FOREIGN PATENT DOCUMENTS

CN 112433754 B * 5/2022 ............ G06N 3/045

OTHER PUBLICATIONS

Utture et al., "Striking a Balance: Pruning False-Positives from Static Call Graphs", 2022, ACM, pp. 2043-2055. (Year: 2022).*
Nanjing University, "Java function annotation automatic generation method based on program analysis", 2022, CN patent No. CN112433754B, retrieved from Google Patent translation, 12 pages. (Year: 2022).*
Le-Cong et al., "AutoPruner: Transformer-Based Call Graph Pruning", 2022, arXiv, 13 pages. (Year: 2022).*
Holland, Ben. Call Graph Construction Algorithms Explained. www.ben.holland.com. Ben Holland. Mar. 20, 2016. URL: https://ben-holland.com/call-graph-construction-algorithms-explained/, 26 pages.

* cited by examiner

*Primary Examiner* — Ted T. Vo
(74) *Attorney, Agent, or Firm* — Athorus, PLLC

(57) ABSTRACT

Described are example systems and methods generally directed to processing program information associated with a computer program to generate an annotated call graph. The annotated call graph may include nodes that represent functions included in the program and edges that represent function calls, relationships, and/or other dependencies between the functions included in the computer program, as well as annotations associated with one or more edges and/or one or more nodes of the call graph. Each annotation may correspond to an edge or node of the call graph and may include a score that represents a strength and/or likelihood of certain features and/or characteristics of the associated edge and/or node.

20 Claims, 8 Drawing Sheets

GENERATION OF ANNOTATED CALL GRAPHS

BACKGROUND

Software analysis is typically an integral part of the software development and deployment process. Employing robust software analysis tools and techniques can facilitate, for example, testing of the code, understanding operation of the code, debugging of the code, optimization of the code, improving performance of the code, auditing of the code, design and/or test verification of the code, and the like. One such software analysis tool that is often employed is a call graph. Call graphs typically include nodes that represent functions of the code and edges between the nodes that represent relationships and/or function calls between the functions of the code and are traditionally generated using static analysis of the code (e.g., without executing the code) or dynamic analysis of the code (e.g., via execution of the code). Although call graphs generated via static analysis and dynamic analysis provide useful information regarding the code being analyzed, both statically generated call graphs and dynamically generated call graphs have limitations. For example, statically generated call graphs (e.g., using techniques such as a reachability analysis, a class hierarchy analysis, a rapid type analysis, a variable type analysis, and the like) may produce "sound" call graphs, which typically include all edges that are possible at runtime, but may have difficulty producing "precise" call graphs, which typically include only the edges that occur at runtime.

BRIEF DESCRIPTION OF DRAWINGS

The detailed description is described with reference to the accompanying figures.

DETAILED DESCRIPTION

Figure 1:
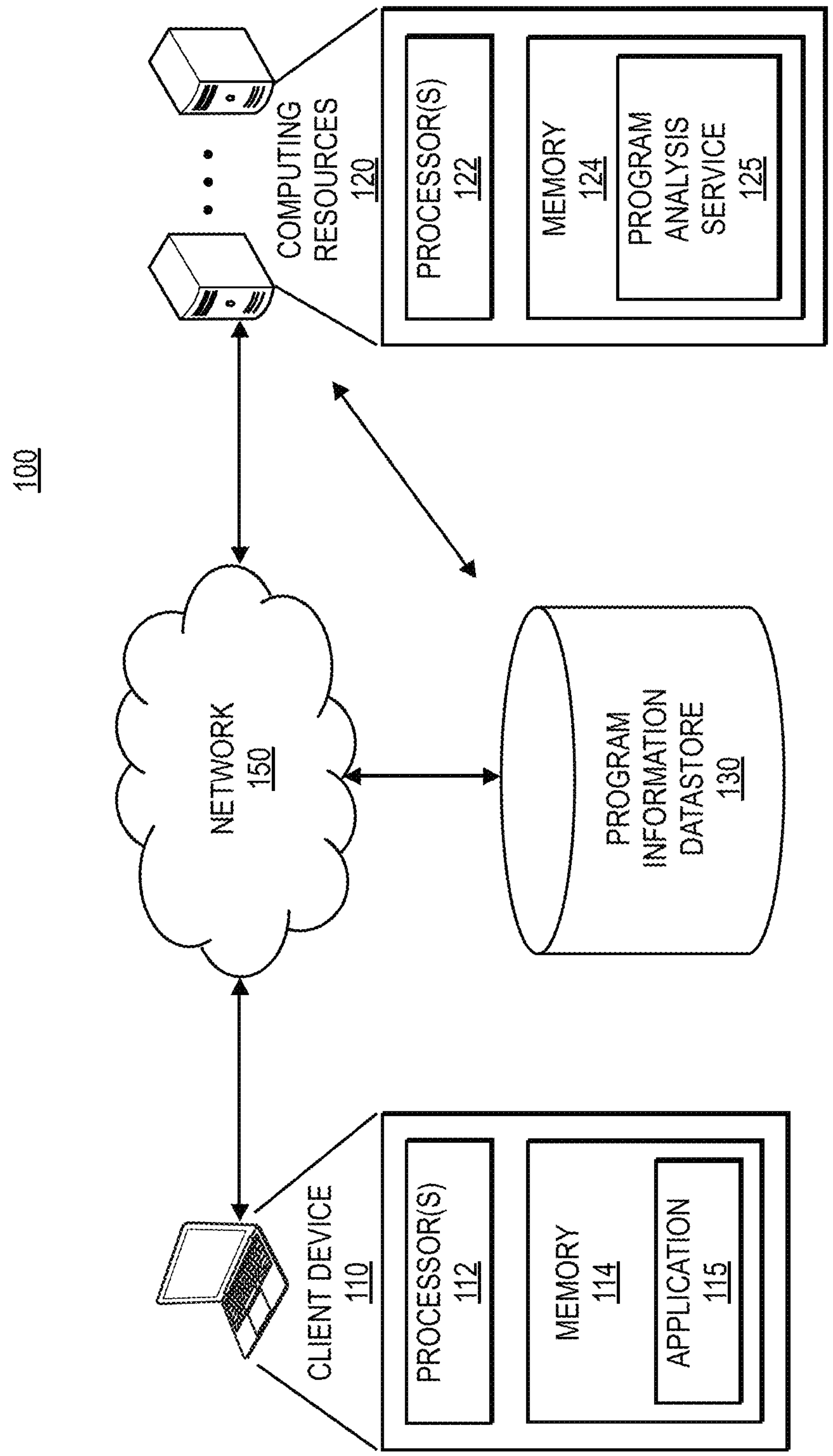
FIG. 1 is an illustration of an exemplary computing environment, according to exemplary embodiments of the present disclosure.

As is set forth in greater detail herein, embodiments of the present disclosure are generally directed to systems and methods for processing program information associated with a computer program to generate an annotated call graph. The annotated call graph may include nodes that represent functions included in the program and edges that represent function calls, relationships, and/or other dependencies between the functions included in the computer program, as well as annotations associated with one or more edges and/or one or more nodes of the call graph. Each annotation may correspond to an edge or node of the call graph and may include a score that represents a strength and/or likelihood of certain features and/or characteristics of the associated edge and/or node. In an exemplary implementation of the present disclosure, the annotations may be associated with corresponding edges of the call graph and may include a prediction score that represents a likelihood that the function call represented by the corresponding edges is called and/or performed. Accordingly, the exemplary annotated call graph generated according to exemplary embodiments of the present disclosure may bridge the shortcomings of both statically generated call graphs and dynamically generated call graphs by including the information typically included in statically generated call graphs and also including annotations representing a likelihood that each function call may be called at run-time, without having to expend the resources of executing the program.

According to exemplary embodiments of the present disclosure, the annotated call graphs may be generated by a machine learning model trained to receive and process program information (e.g., a statically generated call graph, source code, complied/machine code, run-time information, etc.) to generate the annotated call graph. The machine learning model may employ one or more language models, a summarization model, and a graphical neural network (GNN) and may be trained using training datasets including source code, compiled/machine code, and/or dynamic traces associated with executed code. Accordingly, the machine learning model may learn generating function embeddings representative of the functions included in the code that encode semantic/lexical information, static information, and dynamic/run-time information, as well as relationships therebetween, and generating annotations for the annotated call graph based on the function embeddings.

In exemplary implementations of the present disclosure, program information (e.g., source code, complied/machine code, run-time information, a statically generated call graph, etc.) may be input to the trained model. The language model of the trained model may be configured to tokenize the program information and generate embeddings representative of the program information. A summarization model of the trained model may generate function embeddings representative of each function in the code. Accordingly, the function embeddings may correspond to the nodes of a statically generated call graph for the program. The function embeddings may be processed (e.g., using the GNN) to infer annotations associated with edges and/or nodes of the statically generated call graph. According to certain aspects of the present disclosure, a graphical representation of the annotated call graph may then be generated, which may include graphical indications of the annotations (e.g., colors, symbols, text, etc.), and returned.

According to other aspects of the present disclosure, the trained machine learning model may be fine-tuned to generate annotations that may include predictions scores that represent the strength and/or likelihood of other features, characteristics, and/or parameters of the computer program in connection with other tasks that may have been identified in connection with analyzing the computer program. For example, it may be desirable to fine-tune the trained machine learning model so as to configure the trained machine learning model to determine the strength of relationships/dependencies between functions (e.g., frequency of calls, etc.), the location of certain data (e.g., sensitive information, etc.), a source node and/or a sink node associated with variables and/or other data objects utilized by the program, and the like. Accordingly, to generate the fine-tuned model, additional training datasets may be generated in view of the particular task for which the trained machine learning model may be fine-tuned, and the training datasets may then be utilized to fine-tune the trained machine model to learn the task for which it is trained.

Although embodiments of the present disclosure are primarily described with conventional computer programs, embodiments of the present disclosure can also be applicable to other computing platforms and/or environments, such as cloud computing applications (e.g., virtual machines, containers, serverless computing applications, etc.) and the like, which may benefit from determining relationships, dependencies, and the like between and within applications.

FIG. 1 is an illustration of an exemplary computing environment 100, according to exemplary embodiments of the present disclosure.

As shown in FIG. 1, computing environment 100 may include one or more client devices 110, also referred to as user devices, for connecting over network 150 to access computing resources 120. Client device 110 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client device 110 and computing resources 120. Computing resources 120 may include one or more processors 122 and one or more memory 124, which may store one or more applications, such as program analysis service 125, that may be executed by processor(s) 122 to cause processor(s) 122 of computing resources 120 to perform various program analysis functions and/or actions according to exemplary embodiments of the present disclosure, as described herein. For example, program analysis service 125 may be configured to generate annotated call graphs, and/or provide other program analysis information in connection with an analysis of a computer program.

According to aspects of the present disclosure, computing resources 120 may represent at least a portion of a networked computing system that may be configured to provide online applications, services, computing platforms, servers, and the like, that may be configured to execute on a networked computing system. Further, computing resources 120 may communicate (e.g., via network 150, as part of computing resources 120, etc.) with one or more datastore (s), such as program information datastores 130. Program information datastore 130 may include, for example, a code repository, etc., and be configured to store and maintain a various program information (e.g., source code, compiled/machine code, code run-time information, dynamic trace information, call graphs, and the like), which may be provided to and utilized by program analysis service 125 in connection with analyzing and/or providing annotated call graphs for one or more computer programs.

According to exemplary implementations of the present disclosure, computing resources 120 may be representative of computing resources that may form a portion of a larger networked computing platform (e.g., a cloud computing platform, and the like), which may be accessed by client device 110. Computing resources 120 may provide various services and/or resources and do not require end-user knowledge of the physical premises and configuration of the system that delivers the services. For example, computing resources 120 may include "on-demand computing platforms," "software as a service (SaaS)," "infrastructure as a service (IaaS)," "platform as a service (PaaS)," "platform computing," "network-accessible platforms," "data centers," "virtual computing platforms," and so forth. Example components of a remote computing resource, which may be used to implement computing resources 120, are discussed below with respect to FIG. 6.

As illustrated in FIG. 1 client device 110 may access and/or interact with program analysis service 125 through network 150 via one or more applications 115 operating and/or executing on client device 110. For example, a user associated with client device 110 may launch and/or execute an application on client device 110 to access and/or interact with applications and/or services, such as program analysis service 125, executing on computing resources 120 via network 150. Upon accessing program analysis service 125 executing on remote computing resources 120, a user associated with client device 110 may specify a computer program to be analyzed and request the generation of an annotated call graph and/or other program analysis information determined in connection with the specified computer program. For example, the user associated with client device 110 may be performing an audit of the computer program, testing the computer program, studying the computer program to understand the operation of the code, debugging the computer program, optimizing the computer program, performing design and/or test verification of the computer program, and the like in accessing program analysis service 125 to perform an analysis of the code. The analysis may include generation of an annotated call graph of the code, analysis information regarding dependencies and/or relationships within the code, source and/or sink nodes associated with variables and/or other data objects within the code, the location of certain data (e.g., sensitive information, etc.) within the code, and the like.

According to exemplary embodiments of the present disclosure, the user may, via application 115 executing on client device 110, provide and/or specify computer program information associated with the computer program to be analyzed to program analysis service 125, along with the request to analyze the computer program. For example, the computer program information may include one or more of source code associated with the computer program, compiled/machine code associated with the computer program, static analysis information, such as a statically generated call graph, etc. associated with the computer program, run-time information and/or dynamic analysis information, such as dynamic traces, dynamically generated call graph, etc., associated with the computer program, and the like. In implementations where a statically generated call graph is not provided as computer program information, one may be generated based on the computer program information. Further, different programs analyzed by program analysis service 125 may have different available program information. For example, while source code, compiled code, static information, and run-time information (e.g., dynamic traces, etc.) may be available for certain programs, for other programs, only the compiled code may be available. According to certain aspects of the present disclosure, the computer program information may be stored and/or maintained by program information datastore 130 and may be accessed, transmitted, and/or retrieved by program analysis service 125 from program information datastore 130. Optionally, the user may also provide further input information that may be of interest and/or relevant to the program analysis, such as variables and/or other data objects that may be of interest, and the like.

In an exemplary implementation of the present disclosure, program analysis service 125 may be configured to process the provided program information (and any additional input information) and generate an annotated call graph for the computer program based on the provided program information. The annotated call graph may be a graphical representation of the code and may include nodes that represent functions defined and/or called in the code and edges connecting the nodes that represent function calls, relationships and/or dependencies, and the like between the functions. Further, the annotated call graph may include annotations associated with one or more of the nodes and/or edges of the call graph. In an exemplary implementation, the annotations may be a representation of a likelihood (e.g., a floating-point number between 0 and 1, etc.) that the associated node and/or edge may be called and/or performed upon execution of the code. According to other implementations of the present disclosure, the annotations may represent other features, parameters, and/or characteristics of the code.

According to exemplary implementations of the present disclosure, program analysis service 125 may employ one or more trained machine learning models to process the program information and generate an annotated call graph for the code based on the program information. For example, the one or more trained machine learning models may include deep neural networks ("DNN"s), convolutional neural networks ("CNN" s), region-based CNNs ("R-CNN"s), recurrent neural networks ("RNN"s), long short-term memory ("LSTM") networks, and the like. In an exemplary implementation, the trained machine learning model may include a transformer-based language model (e.g., bidirectional encoder representations from transformers ("BERT"), large language model ("LLM"), etc.) configured to generate embeddings that represent the program information and encode lexical and/or semantic information extracted from the program information, static information extracted from the program information, dynamic/run-time information extracted from the program information, relationships between the static, lexical and/or semantic, and/or dynamic/run-time information, and the like. The generated embeddings may then be processed by an encoder and/or a summarization model to generate function embeddings representative of each function included in the code that encodes the lexical and/or semantic information, static information, dynamic/run-time information, and relationships between the static, lexical and/or semantic, and/or dynamic/run-time information for each corresponding function. The summary embeddings may then be processed by a graphical neural network ("GNN") to infer the annotations corresponding to one or more of the edges and/or nodes of a call graph corresponding to the code.

A graphical representation of the annotated call graph may be generated and returned for presentation on client device 110 in response to the request to analyze the computer program. The annotated call graph may include various graphical features. For example, the annotations may be presented in text, colors, symbols, bolding/emphasizing features, etc., where colors and/or symbols can represent ranges of annotation values. Further, certain thresholds may be determined and edges and/or nodes associated with an annotation below the threshold may be omitted from the presentation of the call graph on client device 110.

Figure 2A:
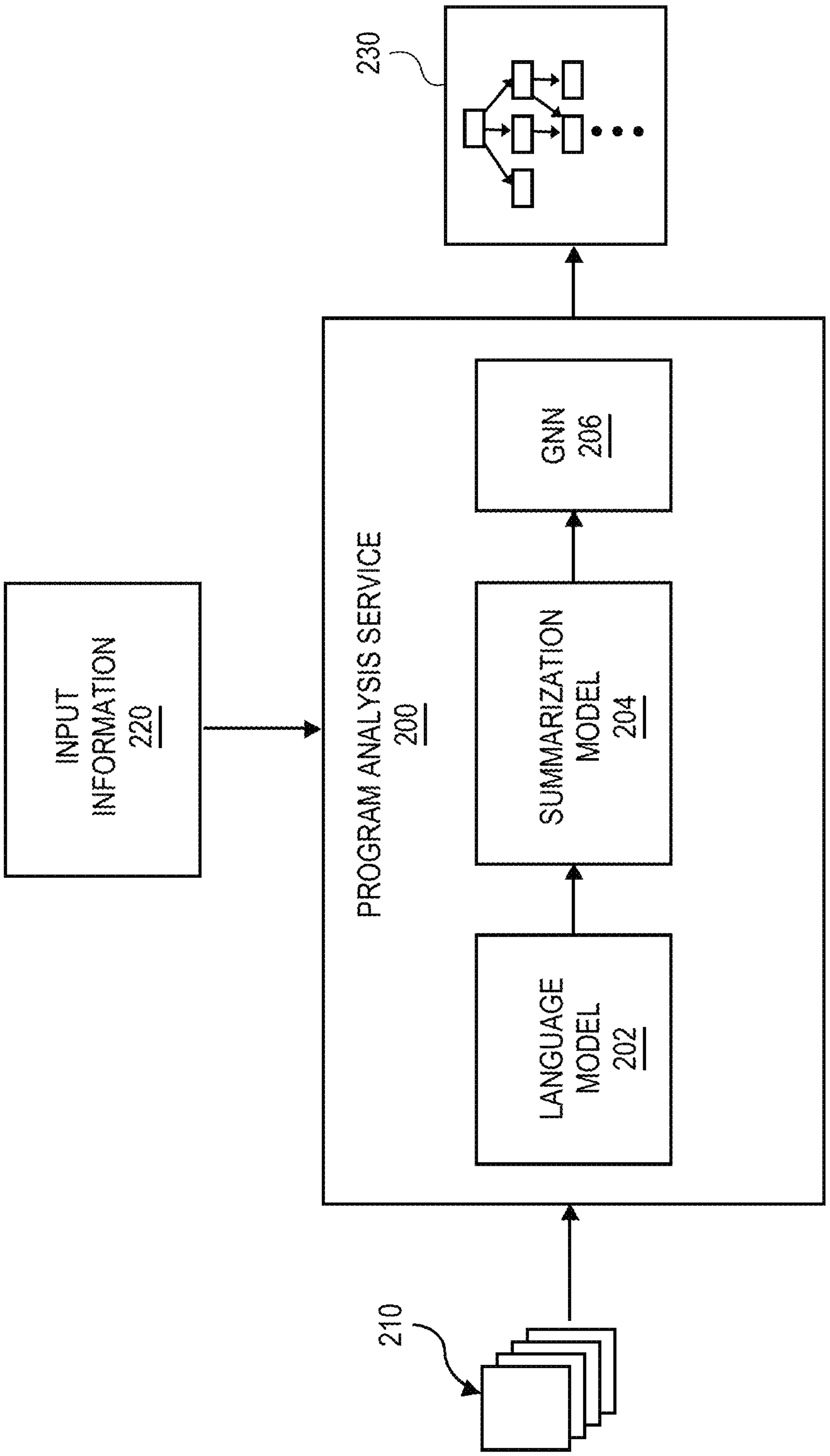
FIGS. 2A-2C are block diagrams of an exemplary program analysis service, according to exemplary embodiments of the present disclosure.
Figure 2B:
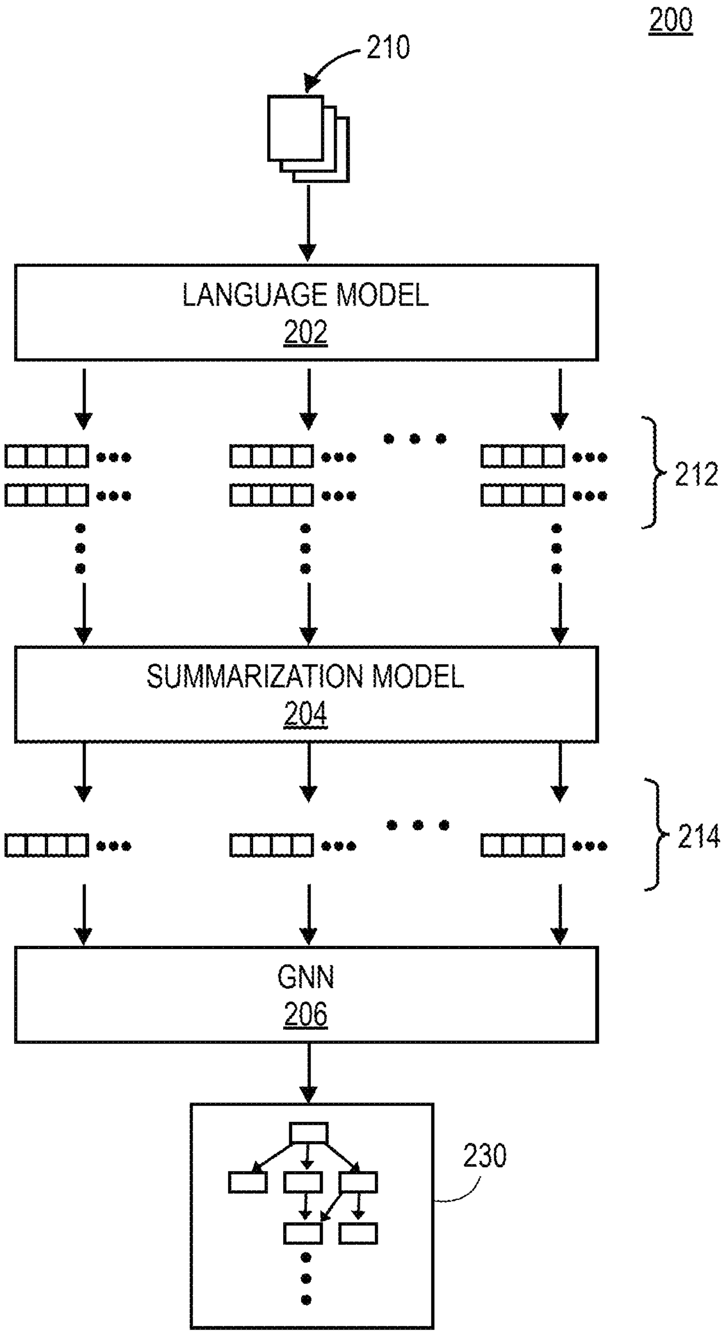
Figure 2C:
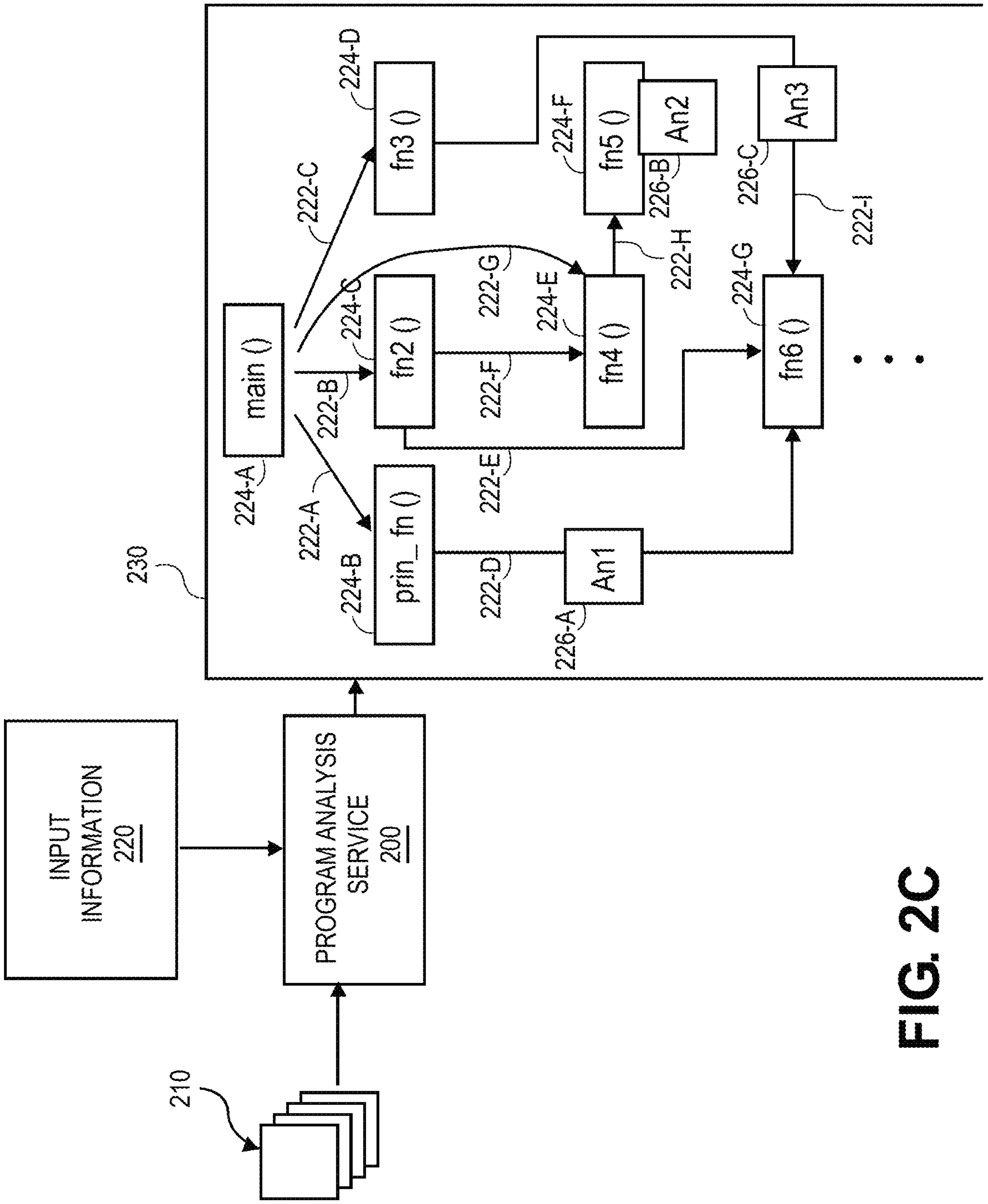

FIGS. 2A-2C are block diagrams of an exemplary program analysis service 200, according to exemplary embodiments of the present disclosure.

As shown in FIGS. 2A-2C, exemplary program analysis service 200 may include one or more trained machine learning models configured to process program information 210 and input information 220 to generate annotated call graph 230. In an exemplary implementation, program information 210 may include one or more of source code associated with the computer program to be analyzed, compiled/machine code associated with the computer program to be analyzed, static analysis information associated with the computer program to be analyzed (e.g., a statically generated call graph, etc.), run-time information and/or dynamic analysis associated with the computer program to be analyzed (e.g., execution traces, dynamically generated call graphs, etc.), and the like. Further, based on the program being analyzed, only some of the program information may be available. For example, for certain programs, only the compiled code may be available, while for other programs, compiled code and run-time information (e.g., dynamic traces, etc.), may be available, while for other programs, source code, compiled code, static information, and run-time information (e.g., dynamic traces, etc.) may all be available. Optionally, input information 220 may also be provided to program analysis service 200. For example, input information 220 may include further input information that may be of interest and/or relevant to the program analysis, such as variables and/or other data objects included in the code that may be of interest (e.g., location of sensitive information, etc.), a statically generated call graph, and the like.

In an exemplary embodiment of the present disclosure, program information 210 and/or input information 220 preferably includes a statically generated call graph of the program to be analyzed. Alternatively and/or in addition, a statically generated call graph may be generated (e.g., by program analysis service 200 and/or another application and provided to program analysis service 200, etc.) based on program information 210 and/or input information 220. The statically generated call graph may include one or more nodes that represent functions included in the program to be analyzed and edges that represent relationships, such as function calls, etc., between the functions included in the program to be analyzed.

In the implementation illustrated in FIGS. 2A and 2B, program information 210 may be processed by one or more transformers of language model 202 to tokenize the information included in program information 210 and generate embeddings 212 to encode the tokenized information as embeddings 212. According to aspects of the present disclosure, embeddings 212 may be multi-dimensional vector representations that include any number of floating-point or binary values (e.g., 128, 256, 512, 1024, etc. values) that represent the tokenized program information 210. Language model 202 may include one or more language models, such as a BERT model, other natural language processing ("NLP") model, a pre-trained transformer model having one or more encoders and/or decoders, an LLM, one or more deep learning models such as convolutional neural networks, or recurrent neural networks, or any other model, which may be trained to process the various types of program information 210 and extract and encode various information in embeddings 212. According to exemplary implementations of the present disclosure, language model 202 may be trained to process program information 210 and generate embeddings 212.

As shown in FIGS. 2A and 2B, embeddings 212 may then be provided to summarization model 204, which may be configured to process embeddings 212 and generate function embeddings 214 for each function included in the program being analyzed. Summarization model 204 may include, for example, an extractive summarizer, an abstractive summarizer, an encoder, or other model configured to generate function embeddings 214. According to exemplary implementations of the present disclosure, function embeddings 214 be configured to extract lexical and/or semantic information (e.g., as variable names, function names, comments, etc.), static information (e.g., function calls, data flow information, execution paths, statically generated call graphs, etc.), dynamic/run-time information (e.g., as execution traces, and the like), relationships between the static, lexical and/or semantic, and/or dynamic/run-time information, and encode the extracted information in function embeddings 214. Further, each function embedding 214 may represent a corresponding function in the program being analyzed. Accordingly, each function embedding 214 may represent a corresponding node in the statically generated call graph for the program being analyzed.

After function embeddings 214 have been generated, GNN 206 may process function embeddings 214 (which correspond to nodes of the statically generated call graph) to determine annotations for the statically generated call graph. For example, a last stage and/or layer of GNN 206 may include a classifier trained to generate annotations associated with one or more edges and/or nodes of the statically generated call graph. In an exemplary implementation of the present disclosure, the annotations may be associated with the edges of the statically generated call graph and may represent a likelihood that a function call, represented by a respective edge of the statically generated call graph, may be called and/or performed. According to other implementations of the present disclosure, GNN 206 may be trained to determine annotations corresponding to other tasks. For example, the annotations generated by GNN 206 may represent the strength and/or likelihood of other features, characteristics, and/or parameters of the computer program in connection with other tasks that may have been identified in connection with analyzing the computer program. For example, GNN 206 may be trained (or fine-tuned) to determine the strength of relationships/dependencies between functions (e.g., frequency of calls, etc.), the location of certain data (e.g., sensitive information, etc.), data flow information, a source node and/or a sink node associated with variables and/or other data objects utilized by the program, and the like. Accordingly, after the annotations have been determined by GNN 206, annotated call graph 230 may be generated and provided. According to aspects of the present disclosure, in implementations where run-time and/or dynamic information is not available for a program and is not provided to program analysis service 200 as part of program information 210 and/or input information 220, annotated call graph 230 may be generated without having to execute the program being analyzed. Accordingly, this provides an indication of which functions call likely will (and will not) be made, without expending the resources of executing the code.

As shown in FIG. 2C, annotated call graph 230 may include one or more nodes 224 (e.g., nodes 224-A, 224-B, 224-C, 224-D, 224-E, 224-F, and/or 224-G) and one or more edges 222 (e.g., edges 222-A, 222-B, 222-C, 222-D, 222-E, 222-F, 222-G, 222-H, and/or 222-I). According to aspects of the present disclosure, each node 224 may correspond to a function included in the program being analyzed by program analysis service 200, and edges 222 may correspond to function calls, relationships, and/or dependencies between the function included in the program being analyzed by program analysis service 200. For example, edge 222-A may represent a call to function prin_fn ( ) which is associated with node 224-B, from function main ( ) which is associated with node 224-A. Similarly, edge 222-B may represent a call to function fn2 ( ) which is associated with node 224-C, from function main ( ) which is associated with node 224-A, edge 222-C may represent a call to function fn3 ( ) which is associated with node 224-D, from function main ( ) which is associated with node 224-A, edge 222-D may represent a call to function fn6 ( ) which is associated with node 224-G from function prin_fn ( ) which is associated with node 224-B, edge 222-E may represent a call to function fn6 ( ) which is associated with node 224-G, from function fn2 ( ) which is associated with node 224-C, edge 222-F may represent a call to function fn4 ( ) which is associated with node 224-E, from function fn2 ( ) which is associated with node 224-C, edge 222-G may represent a call to function fn4 ( ) which is associated with node 224-E, from function main ( ) which is associated with node 224-A, edge 222-H may represent a call to function fn5 ( ) which is associated with node 224-F, from function fn4 ( ) which is associated with node 224-E, and edge 222-I may represent a call to function fn6 ( ) which is associated with node 224-G, from function fn3 ( ) which is associated with node 224-D.

Further, annotated call graph 230 may include annotations 226 (e.g., annotations 226-A, 226-B, and/or 226-C). Annotations 226 may be associated with one or more nodes 224 and/or edges 222 and be determined by program analysis service 200. As shown in FIG. 2C, annotation 226-A may be associated with edge 222-D, annotation 226-B may be associated with node 224-F, and annotation 226-C may be associated with edge 222-I. Although FIG. 2C illustrates annotations 226 associated with certain edges 222 and nodes 224 of annotated call graph 230, according to aspects of the present disclosure, every edge 222 and node 224 may include an associated annotation 226. Further, although annotations 226 are represented as text associated with certain edges 222 and/or nodes 224 of annotated call graph 230, alternatively and/or in addition, annotations 226 may be represented with other graphical features, such as colors, line weights, overlaid text, and the like.

According to exemplary implementations of the present disclosure, annotations 226 may include a value (e.g., a floating-point number between 0 and 1, etc.) that represents a strength and/or likelihood of certain features and/or characteristics of the associated edge and/or node. The features and/or characteristics represented by annotations 226 may depend on the task for which program analysis service 200 was trained. In an exemplary implementation, annotations 226 associated with edges 222 of annotated call graph 230 may represent a likelihood that the corresponding edge 222 is to be called and/or performed. Accordingly, as illustrated in FIG. 2C, annotation 226-A may represent a likelihood that the function call (e.g., a call to fn6( ) by prin_fn( )) represented by edge 222-D will be performed. Similarly, annotation 226-C may represent a likelihood that the function call (e.g., a call to fn6( ) by fn3( )) represented by edge 222-I will be performed.

In exemplary implementations of the present disclosure, annotations 226 may represent other features and/or characteristics of the program represented by annotated call graph 230. For example, annotation 226-A may represent a strength of a relationship between prin_fn( ), associated with node 224-B, and fn6( ), associated with node 224-G. The strength of the relationship between prin_fn( ) and fn6( ) may correspond to a frequency with which fn6( ) is called by prin_fn( ), the strength of data dependencies between prin_fn( ) and fn6( ), and the like. According to aspects of the present disclosure, such information may be useful, for example, in implementations where the program being analyzed is implemented as a cloud computing application (e.g., serverless computing applications, etc.) and annotations 226 can facilitate determining highly dependent functions, so as to co-locate such functions in the same compute node, so as to mitigate network transfer costs compared to scenarios where the highly dependent functions are placed in different compute nodes. According to other implementations of the present disclosure, annotations 226 may represent data flow information, so that source nodes and/or sink nodes of certain data may be determined, the location of certain data may be determined, and the like.

Figure 3:
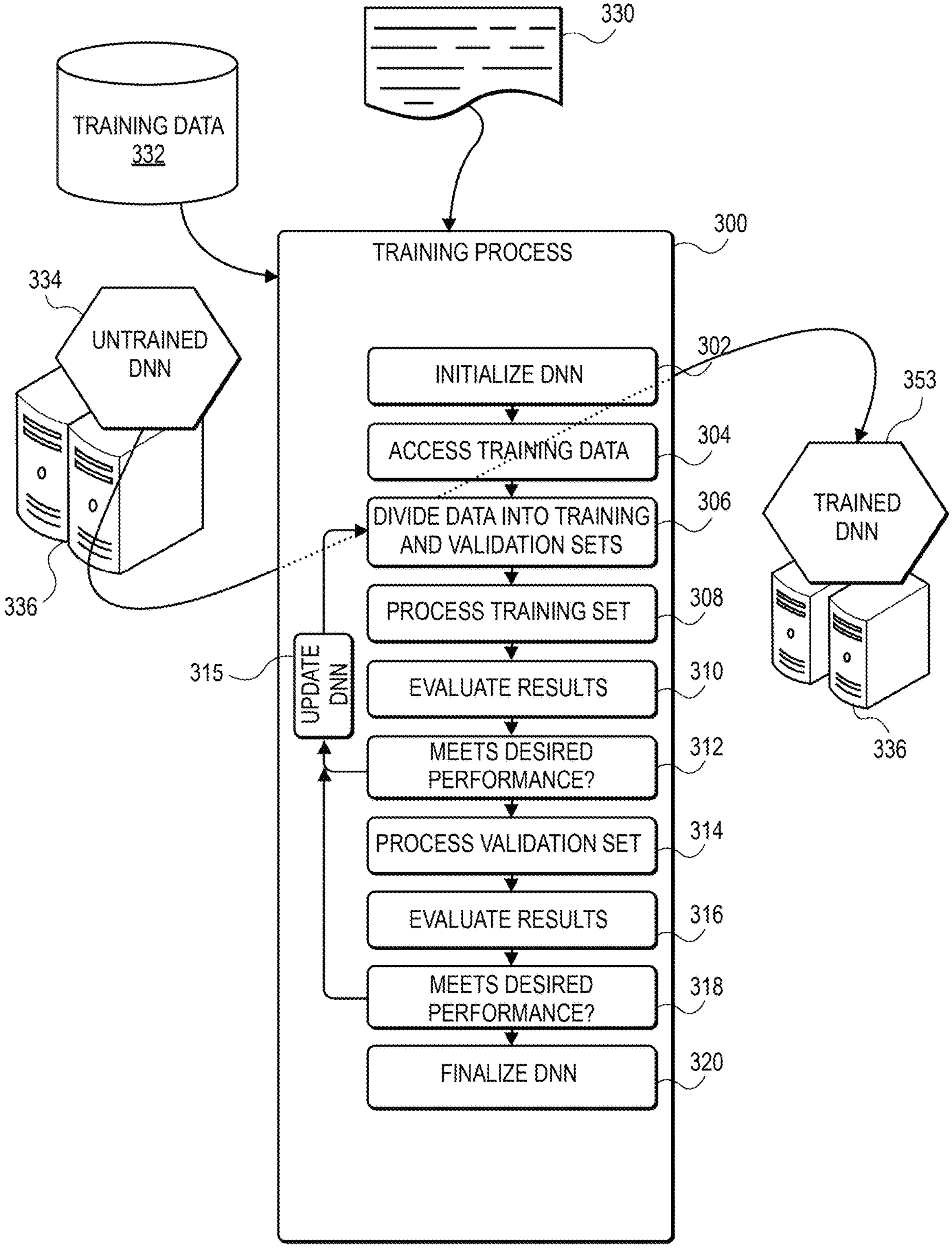
FIG. 3 is a flow diagram of an exemplary deep neural network training process, according to exemplary embodiments of the present disclosure.

FIG. 3 illustrates an exemplary training process 300 of training a deep neural network (DNN), or other machine learning model, according to exemplary embodiments of the present disclosure.

As shown in FIG. 3, training process 300 is configured to train untrained DNN 334 operating on computing resource 336 to transform untrained DNN 334 into trained DNN 353 that operates on the same or another computer system, such as computing resource 336. In the course of training, as shown in training process 300, at step 302, untrained DNN 334 is initialized with training criteria 330. Training criteria 330 may include, but is not limited to, information as to a type of training, and number of layers to be trained, and the like.

At step 304 of training process 300, corpus of training data 332 may be accessed. According to exemplary embodiments of the present disclosure, training data 332 may include training datasets generated from program information associated with various programs, and may include source code, compiled/machine code, byte-code, bit-code, static information, static call graphs, dynamic and/or run-time information, such as dynamic trace information, dynamic call graphs, and the like. According to aspects of the present disclosure, training data 332 may include labeled and/or unlabeled training data.

With the training data 332 accessed, at step 306 training data 332 may be divided into training and validation sets. Generally speaking, the items of data in the training set are used to train untrained DNN 334 and the items of data in the validation set are used to validate the training of the DNN. As those skilled in the art will appreciate, and as described below in regard to much of the remainder of training process 300, there are numerous iterations of training and validation that occur during the training of the DNN.

At step 308 of the training process, the data items of the training set are processed, often in an iterative manner. Processing the data items of the training set includes capturing the processed results. After processing the items of the training set, at step 310, the aggregated results of processing the training set are evaluated, and at step 312, a determination is made as to whether a desired performance has been achieved. If the desired performance is not achieved, in step 315, aspects of the DNN are updated in an effort to guide the DNN to generate more accurate results, and processing returns to step 306, where a new set of training data is selected, and the process repeats. Alternatively, if the desired accuracy level is achieved, the training process 300 advances to step 314.

At step 314, and much like step 308, the data items of the validation set are processed, and at step 316, the processing performance of this validation set is aggregated and evaluated. At step 318, a determination is made as to whether a desired performance, in processing the validation set, has been achieved. If the desired accuracy level is not achieved, in step 315, aspects of the DNN are updated in an effort to guide the DNN to generate more accurate results, and processing returns to step 306. Alternatively, if the desired performance is achieved, the training process 300 advances to step 320.

At step 320, a finalized, trained DNN 353 is generated. Typically, though not exclusively, as part of finalizing the now-trained DNN 353, portions of the DNN that are included in the model during training for training purposes are extracted, thereby generating a more efficient trained DNN 353.

Figure 4:
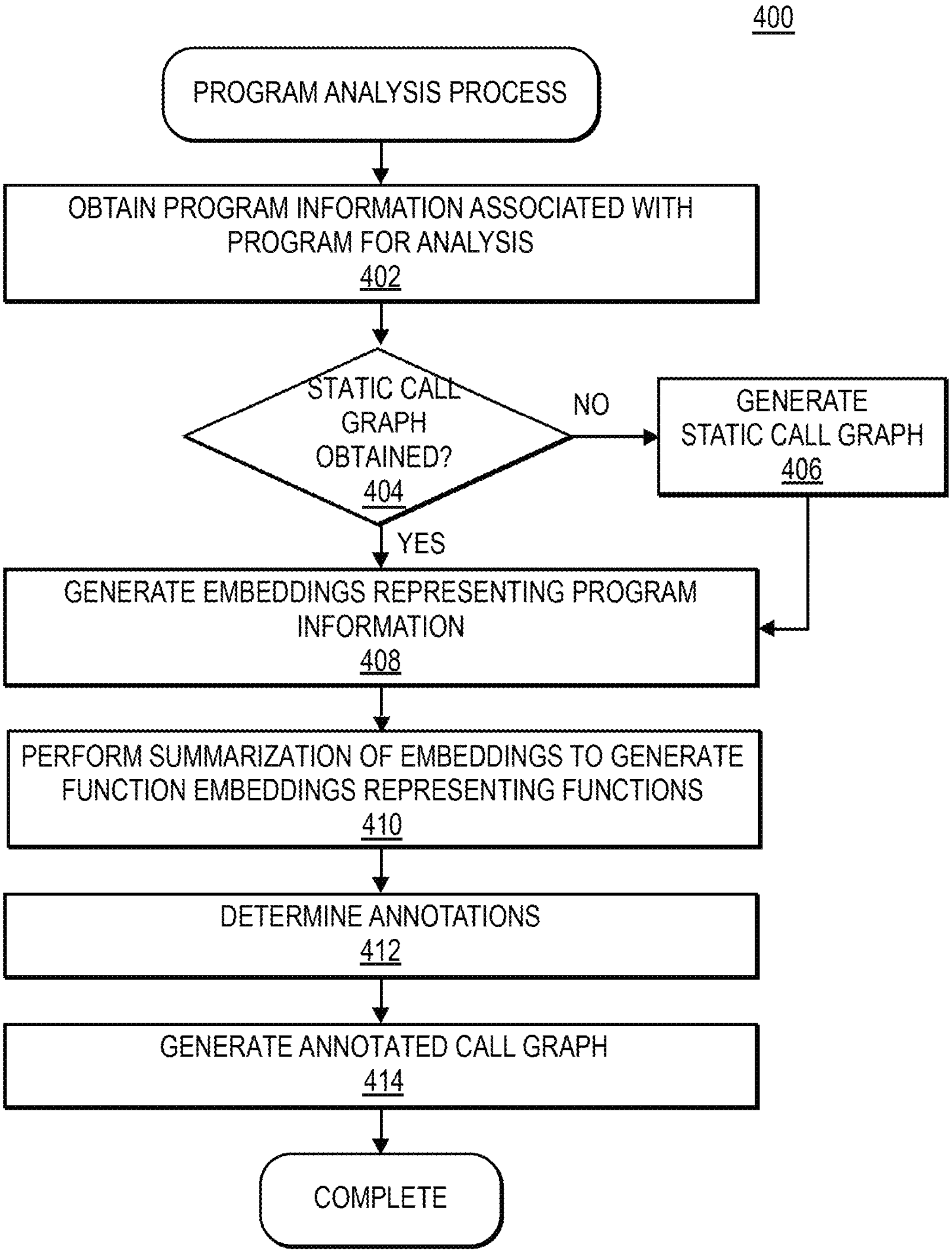
FIG. 4 is a flow diagram of an exemplary program analysis process, according to exemplary embodiments of the present disclosure.

FIG. 4 is a flow diagram of an exemplary program analysis process 400, according to exemplary embodiments of the present disclosure.

As shown in FIG. 4, exemplary program analysis process 400 may begin with obtaining program information associated with the program to be analyzed, as in step 402. For example, the program information may include one or more of source code associated with the computer program to be analyzed, compiled/machine code associated with the computer program to be analyzed, static analysis information associated with the computer program to be analyzed (e.g., a statically generated call graph, etc.), run-time information and/or dynamic analysis associated with the computer program to be analyzed (e.g., execution traces, dynamically generated call graphs, etc.), and the like. Optionally, further input information that may be of interest and/or relevant to the program analysis, such as variables and/or other data objects included in the code that may be of interest (e.g., location of sensitive information, etc.), a statically generated call graph, and the like, may also be included and obtained as program information in step 402.

In step 404, it may be determined whether a static call graph was obtained in connection with the program information obtained in step 402. In the event that a static call graph was not obtained, in step 406, a static call graph for the program being analyzed may be generated based on the program information obtained in step 402.

Program analysis process 400 may then proceed to step 408, where embeddings representing the program information obtained in step 402 may be generated. According to exemplary implementations of the present disclosure, a trained language model (e.g., an NLP model, a BERT model, an LLM, or other transformer-based model, etc.) may process the program information to generate the embeddings that represent the program information. For example, the language model may tokenize the program information and encode the program information as embeddings. According to aspects of the present disclosure, the embeddings may be multi-dimensional vector representations that include any number of floating-point or binary values (e.g., 128, 256, 512, 1024, etc. values) that represent various features and/or characteristics of the program information.

After generation of the embeddings that represent the program information, in step 410, summarization of the embeddings may be performed to generate function embeddings that represent functions of the program being analyzed and correspond to nodes of the static call graph may be performed. According to exemplary embodiments of the present disclosure, the summarization may be performed by one or more models (e.g., an extractive summarizer, an abstractive summarizer, an encoder, or other model) configured to generate function embeddings that represent the functions of the program being analyzed and encode lexical and/or semantic information, static information, and/or dynamic/run-time information, as well as learned relationships between the lexical and/or semantic information, static information, and/or dynamic/run-time information.

After the function embeddings have been generated, the function embeddings may be processed to determine annotations, as in step 412. For example, a GNN may process the function embeddings (which correspond to nodes of the statically generated call graph) to determine annotations for the statically generated call graph. For example, a last stage and/or layer of the GNN may include a classifier trained to generate annotations associated with one or more edges and/or nodes of the statically generated call graph. In an exemplary implementation of the present disclosure, the annotations may be associated with the edges of the statically generated call graph and may represent a likelihood that a function call, represented by a respective edge of the statically generated call graph, may be called and/or performed. According to other implementations of the present disclosure, the GNN may be trained to determine annotations corresponding to other tasks. For example, the annotations generated by the GNN may be associated with one or more nodes and/or edges of the call graph and may represent the strength and/or likelihood of other features, characteristics, and/or parameters of the computer program in connection with other tasks that may have been identified in connection with analyzing the computer program. For example, the GNN may to determine the strength of relationships/dependencies between functions (e.g., frequency of calls, etc.), the location of certain data (e.g., sensitive information, etc.), data flow information, a source node and/or a sink node associated with variables and/or other data objects utilized by the program, and the like. Accordingly, after the annotations have been determined, an annotated call graph may be generated and provided, as in step 414.

Figure 5:
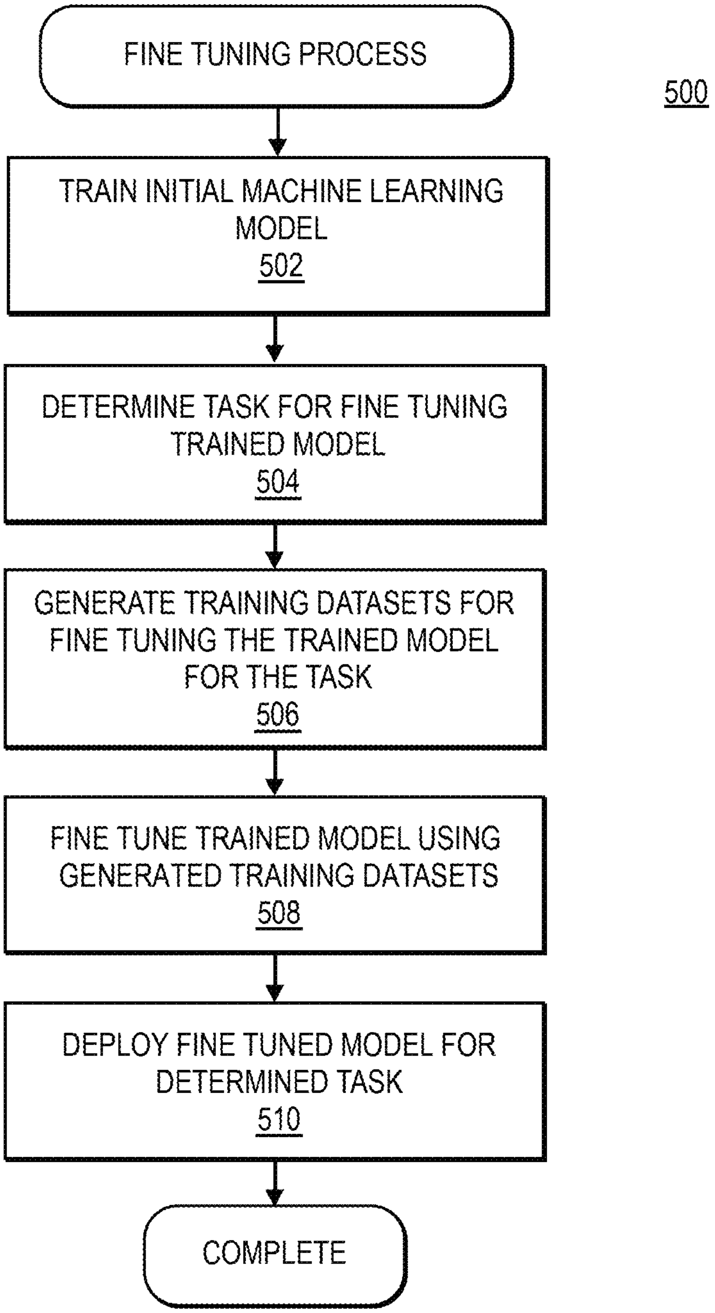
FIG. 5 is a flow diagram of an exemplary fine-tuning process, according to exemplary embodiments of the present disclosure.

FIG. 5 is a flow diagram of an exemplary fine-tuning process 500, according to exemplary embodiments of the present disclosure.

As shown in FIG. 5, exemplary fine-tuning process 500 may begin with training an initial machine learning model, as in step 502. For example, one or more machine learning models may be trained to generate annotations for a statically generated call graph that may be associated with edges of the call graph that represent function calls of a program. The annotations determined by the trained machine learning model may represent a likelihood that the edge with which it is associated may be performed. Training of the initial machine learning model is described in further detail herein in connection with FIG. 3.

After training of the initial machine learning model, a task for fine-tuning the trained model may be determined, as in step 504. According to exemplary embodiments of the present disclosure, the trained machine learning model may be fine-tuned to determine other features, parameters, characteristics, and/or information regarding the program being analyzed. For example, the trained machine learning model may be determined to determine the strength of relationships/dependencies between functions (e.g., frequency of calls, data flow, etc.), the location of certain data (e.g., sensitive information, etc.), data flow information, source and/or sink nodes associated with variables and/or other data objects utilized by the program, and the like.

In step 506, training datasets may be generated for fine-tuning the initial trained model in view of the task. According to aspects of the present disclosure, the training datasets may include curated data that may include source code, compiled/machine code, statically generated information, run-time information, dynamic traces associated with executed code, other dynamically generated information, and the like. After generation of the training datasets, the initial trained model may be fine-tuned using the generated training datasets, as in step 508, and deployed, as in step 510.

Figure 6:
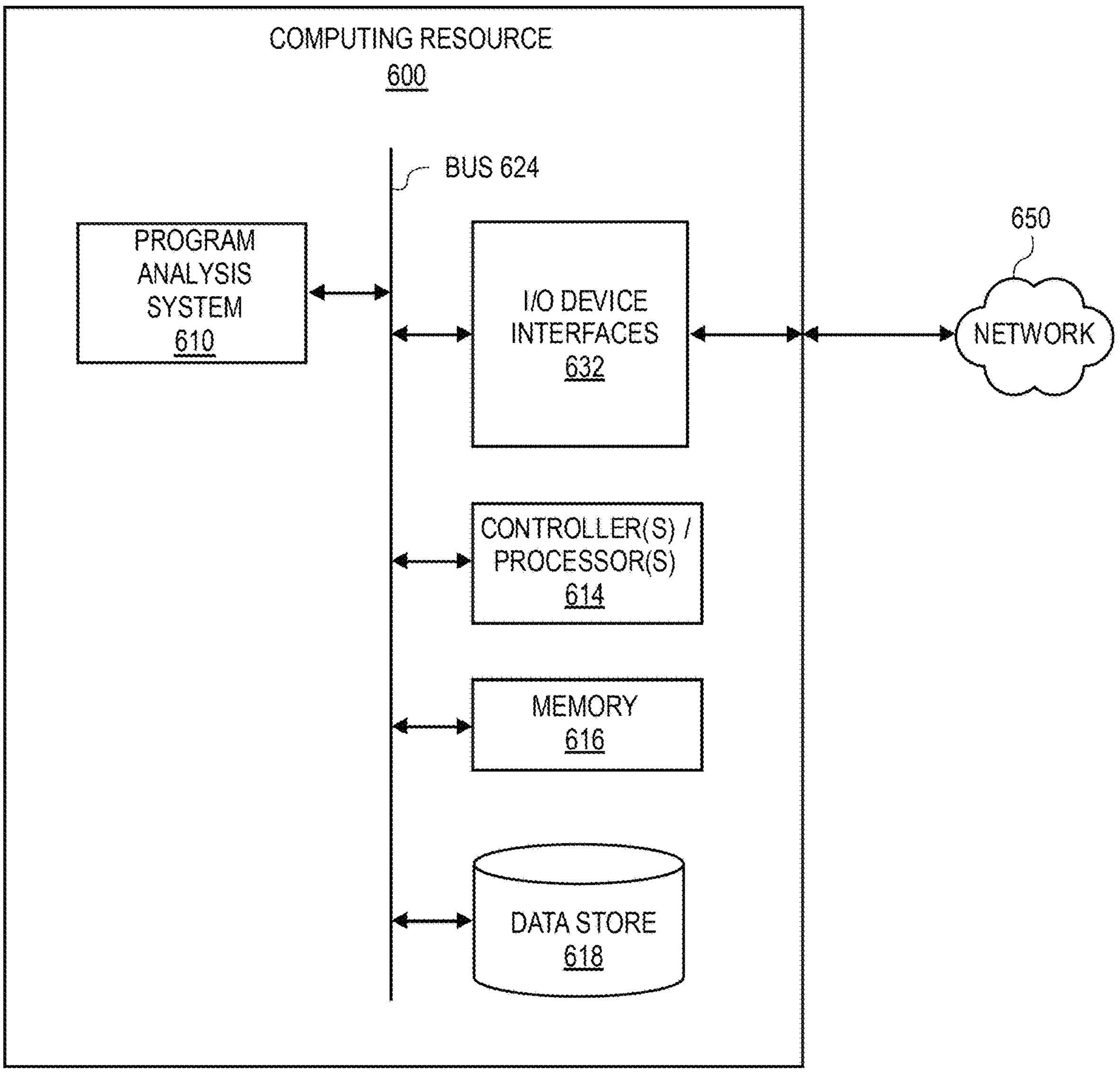
FIG. 6 is a block diagram of an exemplary computing resource, according to exemplary embodiments of the present disclosure.

FIG. 6 is a block diagram of an exemplary computing resource 600, according to exemplary embodiments of the present disclosure. According to certain implementations, computing resource 600 may form, for example, computing resources 120, and may include and/or execute program analysis system 610. In exemplary implementations, multiple computing resources 600 may be included in the system.

As shown in FIG. 6, computing resource 600 may include one or more controllers and/or processors 614, that may each include a central processing unit (CPU) for processing data and computer-readable instructions, and memory 616 for storing data and instructions. Memory 616 may individually include volatile random-access memory (RAM), non-volatile read only memory (ROM), non-volatile magnetoresistive random-access memory (MRAM) and/or other types of memory. Each computing resource 600 may also include a data storage component 618, for storing data, controller/processor-executable instructions, machine learning models, data sets, reference data sets, test data sets, program information, call graphs, source code, compiled code, run-time and/or dynamic information, and the like. Each data storage component may individually include one or more non-volatile storage types, such as magnetic storage, optical storage, solid-state storage, etc. Each computing resource 600 may also be connected to removable or external non-volatile memory and/or storage (such as a removable memory card, memory key drive, networked storage, etc.), internal, and/or external networks 650 (e.g., the Internet, cellular networks, satellite networks) through respective input/output device interfaces 632.

Computer instructions for operating computing resource 600 and its various components may be executed by the respective server's controller(s)/processor(s) 614, using the memory 616 as temporary "working" storage at runtime. The computer instructions may be stored in a non-transitory manner in non-volatile memory 616, data storage 618, and/or an external device(s). Alternatively, some or all of the executable instructions may be embedded in hardware or firmware on the respective device in addition to or instead of software.

For example, memory 616 may store program instructions that when executed by the controller(s)/processor(s) 614 cause the controller(s)/processors 614 to perform an analysis of a program and/or generate an annotated call graph, as discussed herein.

Computing resource 600 may also include input/output device interfaces 632. A variety of components may be connected through the input/output device interfaces. Additionally, computing resource 600 may also include an address/data bus 624 for conveying data among components of the respective server. Each component within computing resource 600 may also be directly connected to other components in addition to (or instead of) being connected to other components across the bus 624.

The components of data bus 624, as illustrated in FIG. 6, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3-5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:

generating a plurality of training datasets that include a first plurality of program information associated with a plurality of programs;

accessing the plurality of training datasets to train a machine learning model to determine annotations for a call graph;

subsequent to training of the machine learning model, receiving, by the trained machine learning model, a second plurality of program information associated with a program to be analyzed by the trained machine learning model, wherein the second plurality of program information includes a static call graph having a plurality of edges and a plurality of nodes that represents the program;

processing, using the trained machine learning model, the second plurality of program information to determine a plurality of function embeddings that represent a plurality of functions included in the program and encode lexical information, static information, and dynamic information associated with the program and extracted from the second plurality of program information;

processing, using the trained machine learning model, the plurality of function embeddings to generate a plurality of annotations for the static call graph, wherein the plurality of annotations includes a first annotation that indicates at least one of a location of a first data object, a source node associated with a second data object, or a sink node associated with a third data object; and associating the plurality of annotations with at least a portion of the plurality of edges and the plurality of nodes to generate an annotated call graph.

2. The computer-implemented method of claim 1, wherein:

the plurality of edges represent a plurality of function calls; and each of the plurality of annotations includes a likelihood that a function call represented by a corresponding edge of the plurality of edges is performed.

3. The computer-implemented method of claim 1, further comprising:

determining that a third plurality of program information associated with a second program does not include a second static call graph;

generating the second static call graph; and providing the second static call graph to the trained machine learning model as part of the third plurality of program information in connection with analyzing the second program.

4. The computer-implemented method of claim 1, wherein the trained machine learning model includes:

a language model that processes the second plurality of program information to generate a plurality of embeddings that represent the second plurality of program information;

a summarization model that processes the plurality of embeddings to determine the plurality of function embeddings; and a graphical neural network that processes the plurality of function embeddings to determine the plurality of annotations.

5. The computer-implemented method of claim 1, wherein the second plurality of program information includes compiled code.

6. The claim of claim 5, wherein the second plurality of program information further includes at least one of:

source code of the program; or dynamic traces of the program.

7. A computing system, comprising:

one or more processors; and a memory storing program instructions that, when executed by the one or more processors, cause the one or more processors to at least:

receive a plurality of program information associated with a program being analyzed by the computing system; and process, using a trained model, the plurality of program information to determine a plurality of annotations for a call graph representing the program, wherein:

the plurality of annotations includes a first annotation that indicates at least one of a location of a first data object, a source node associated with a second data object, or a sink node associated with a third data object; and processing the plurality of program information to determine the plurality of annotations includes:

processing the plurality of program information using a language model to generate a plurality of embeddings to represent the plurality of program information;

processing the plurality of embeddings using a summarization model to generate a plurality of function embeddings that represent functions included in the program; and processing the plurality of function embeddings using a graphical neural network (GNN) to determine the plurality of annotations for the call graph.

8. The computing system of claim 7, wherein the program instructions include further instructions that, when executed by the one or more processors, cause the one or more processors to at least:

determine that the plurality of program information does not include a statically generated call graph for the program; and generate a statically generated call graph for the program.

9. The computing system of claim 7, wherein the plurality of function embeddings encode lexical information, static information, and dynamic information associated with the program and extracted from the plurality of program information.

10. The computing system of claim 7, wherein:

the call graph includes a plurality of edges that represent a plurality of function calls in the program; and the plurality of annotations are associated with the plurality of edges and each annotation of the plurality of annotations represents a likelihood that a function call represented by a corresponding edge of the plurality of edges is performed.

11. The computing system of claim 7, wherein the plurality of program information excludes dynamic information and the plurality of annotations are determined without executing the program.

12. The computing system of claim 7, wherein:

the call graph includes a plurality of nodes that represent a plurality of functions in the program and a plurality of edges that represent a plurality of function calls between the plurality of functions in the program; and the plurality of annotations are associated with at least a portion of the plurality of edges and the plurality of nodes and each annotation of the plurality of annotations represents a strength of a dependency between two or more functions of the plurality of functions.

13. The computing system of claim 7, wherein:

the program instructions include further instructions that, when executed by the one or more processors, cause the one or more processors to at least receive an input specifying at least one of the first data object, the second data object, or the third data object; and the plurality of annotations are further determined based at least in part on at least one of the first data object, the second data object, or the third data object.

14. The computing system of claim 7, wherein:

the program is implemented as a serverless application on a cloud computing platform; and the plurality of annotations represent a strength of dependencies between functions.

15. The computing system of claim 7, wherein the program instructions include further instructions that, when executed by the one or more processors, cause the one or more processors to at least:

identify an analysis task to be performed by the trained model in connection with program analysis;

generate, based at least in part on the analysis task, a plurality of training datasets to fine-tune the trained model to perform the analysis task;

fine-tune the trained model using the plurality of training datasets to configure the trained model to perform the analysis task; and deploy the fine-tuned trained model.

16. The computing system of claim 7, wherein:

the trained model is trained using a training dataset including a second plurality of computing information; and the second plurality of computing information includes at least one of:

a plurality of source code;

a plurality of compiled code; or a plurality of dynamic traces.

17. A computer-implemented method, comprising:

training a machine learning model to receive a first plurality of program information associated with a program being analyzed and generate an annotated call graph for the program, wherein the annotated call graph includes a plurality of annotations associated with edges of the call graph that represents a likelihood that each corresponding edge is performed;

identifying an analysis task to be performed by the machine learning model in connection with program analysis, wherein the analysis task includes generating annotations that include an indication of at least one of a location of a first data object, a source node associated with a second data object, or a sink node associated with a third data object;

generating, based at least in part on the analysis task, a plurality of training datasets to fine-tune the machine learning model to perform the analysis task;

fine-tuning the machine learning model using the plurality of training datasets to configure the machine learning model to perform the analysis task; and deploying the fine-tuned machine learning model.

18. The computer-implemented method of claim 17, wherein the trained machine learning model is configured to at least:

process the first plurality of program information using a language model to generate a plurality of embeddings to represent the first plurality of program information;

process the plurality of embeddings using a summarization model to generate a plurality of function embeddings that represent functions included in the program and encode lexical information, static information, and dynamic information associated with the program and extracted from the first plurality of program information; and process the plurality of function embeddings using a graphical neural network (GNN) to determine the plurality of annotations for the call graph.

19. The computer-implemented method of claim 17, wherein the annotations include an indication a strength of a dependency between two or more functions of the plurality of functions.

20. The computer-implemented method of claim 17, wherein the first plurality of program information excludes dynamic information and the annotations of the annotated call graph are determined without executing the program.

* * * * *